(12) United States Patent
Lin (10) Patent No.: US 9,089,238 B2
(45) Date of Patent: Jul. 28, 2015

(54) SOUP MAKER

(71) Applicant: Yu-Yuan Lin, Tainan (TW)

(72) Inventor: Yu-Yuan Lin, Tainan (TW)

(73) Assignee: UNI-SPLENDER CORP., Tainan (TW)

( * ) Notice: Subject to any disclaimer, the term of this patent is extended or adjusted under 35 U.S.C. 154(b) by 173 days.

(21) Appl. No.: 14/050,894

(22) Filed: Oct. 10, 2013

(65) Prior Publication Data

US 2015/0101491 A1     Apr. 16, 2015

(51) Int. Cl.
*A47J 36/16* (2006.01)
*A47J 27/00* (2006.01)
*A47J 43/046* (2006.01)

(52) U.S. Cl.
CPC .............. *A47J 27/004* (2013.01); *A47J 43/046* (2013.01)

(58) Field of Classification Search
CPC ....... A47J 27/004; A47J 36/165; A47J 27/04; A47J 43/044; A47J 2043/0449; A47J 27/10; A47J 43/0777; A47J 27/62; A47J 43/00; A47J 43/04; A47J 44/00; A47J 43/0716; A47J 43/046; A47J 43/0727; A47J 43/087; A47J 43/07; A47J 43/0705; A47J 36/16; A47J 37/1276; A47J 37/101; A47J 37/103; A47J 27/002; A47J 43/085; H04L 12/00; H05B 3/74; H05B 6/12; G06F 17/30; G01G 19/56; G01G 23/02; B01F 13/0033; B01F 13/0872
USPC .......................................................... 99/348
See application file for complete search history.

(56) References Cited

U.S. PATENT DOCUMENTS

| | | | | |
|---|---|---|---|---|
| 2,194,117 A * | 3/1940 | Graham | ......................... | 219/441 |
| 2,194,118 A * | 3/1940 | Graham | ......................... | 219/440 |
| 2,282,866 A * | 5/1942 | Hagen | ........................... | 366/205 |
| 2,969,452 A * | 1/1961 | Geller et al. | .................. | 219/436 |
| 3,007,029 A * | 10/1961 | Levine | .......................... | 219/442 |
| 3,146,691 A * | 9/1964 | Martin | ........................... | 99/330 |
| 3,176,968 A * | 4/1965 | Appleton | ...................... | 366/146 |
| 3,220,450 A * | 11/1965 | Aronson, II et al. | ..... | 241/199.12 |
| 3,391,271 A * | 7/1968 | Campbell | ..................... | 219/440 |
| 3,612,126 A * | 10/1971 | Emmons et al. | ......... | 241/199.12 |
| 4,048,473 A * | 9/1977 | Burkhart | ...................... | 219/389 |
| 4,176,766 A * | 12/1979 | West | ............................. | 222/238 |
| 4,357,520 A * | 11/1982 | Taylor | .......................... | 392/444 |
| 4,435,084 A * | 3/1984 | Calhoun et al. | .............. | 366/130 |
| 4,487,509 A * | 12/1984 | Boyce | .......................... | 366/199 |
| 4,503,502 A * | 3/1985 | Chapin | .......................... | 700/90 |
| 4,762,057 A * | 8/1988 | Hirota et al. | .................... | 99/348 |
| 4,794,228 A * | 12/1988 | Braun, Jr. | ...................... | 219/415 |
| 4,803,920 A * | 2/1989 | Kowalics et al. | ............... | 99/348 |
| 4,817,510 A * | 4/1989 | Kowalics et al. | ............... | 99/331 |
| 4,903,589 A * | 2/1990 | Aoyama | ......................... | 99/348 |
| 4,993,593 A * | 2/1991 | Fabiano et al. | .................... | 222/1 |

(Continued)

*Primary Examiner* — Eric Stapleton (57) ABSTRACT

A soup maker includes a container mounted to an annular seat receiving a heat conducting pan that receives food to be cut by a cutter coupled with a transmission shaft driven by a motor. A heating pan abuts a bottom of the thermally conducting pan and is connected to a heating tube electrically connected to a power supply terminal. A temperature sensor abuts the heating pan. A base includes a coupling portion having a terminal hole and a sensor hole. A positioning plate presses against a positioning switch on the coupling portion when the annular seat couples with the coupling portion, with the power supply terminal and a coupling section of the temperature sensor respectively extending into the terminal hole and the sensor hole for electrical connection with the control circuit board, allowing the control circuit board to control the motor and the heating tube.

3 Claims, 6 Drawing Sheets

(56) References Cited

U.S. PATENT DOCUMENTS

| | | | |
|---|---|---|---|
| 5,048,402 A * | 9/1991 | Letournel et al. | 99/348 |
| 5,117,079 A * | 5/1992 | Morino et al. | 219/726 |
| 5,228,381 A * | 7/1993 | Virgilio et al. | 99/331 |
| 5,564,589 A * | 10/1996 | Fu et al. | 220/608 |
| 5,590,583 A * | 1/1997 | Harrison | 99/327 |
| 5,768,978 A * | 6/1998 | Dorner et al. | 99/348 |
| 6,065,861 A * | 5/2000 | Chen | 366/144 |
| 6,289,793 B1 * | 9/2001 | Hu et al. | 99/332 |
| 6,318,247 B1 * | 11/2001 | Di Nunzio et al. | 99/348 |
| 6,338,569 B1 * | 1/2002 | McGill | 366/144 |
| 6,545,252 B2 * | 4/2003 | Wang | 219/432 |
| 6,792,849 B1 * | 9/2004 | Kim | 99/348 |
| 6,805,312 B2 * | 10/2004 | Capp | 241/36 |
| 6,817,750 B1 * | 11/2004 | Sands | 366/205 |
| 7,619,188 B2 * | 11/2009 | Oghafua et al. | 219/620 |
| 7,780,337 B2 * | 8/2010 | Peng | 366/144 |
| 7,878,702 B2 * | 2/2011 | Peng | 366/145 |
| 7,997,786 B2 * | 8/2011 | Liu | 366/44 |
| 8,028,617 B2 * | 10/2011 | Wang et al. | 99/357 |
| 8,172,453 B2 * | 5/2012 | Boussemart et al. | 366/145 |
| 8,403,555 B2 * | 3/2013 | Wu | 366/205 |
| 8,448,567 B2 * | 5/2013 | Martin et al. | 99/348 |
| 8,646,382 B2 * | 2/2014 | Highnote | 99/403 |
| D701,075 S * | 3/2014 | Wai | D7/357 |
| 8,931,401 B2 * | 1/2015 | Cheung | 99/348 |
| 2001/0002891 A1 * | 6/2001 | Frankel et al. | 366/146 |
| 2006/0044935 A1 * | 3/2006 | Benelli et al. | 366/145 |
| 2006/0153003 A1 * | 7/2006 | Sands | 366/205 |
| 2006/0176770 A1 * | 8/2006 | Sands | 366/205 |
| 2006/0219100 A1 * | 10/2006 | Gelfand | 99/348 |
| 2006/0227654 A1 * | 10/2006 | Blackburn et al. | 366/206 |
| 2006/0263501 A1 * | 11/2006 | Oghafua et al. | 426/523 |
| 2006/0286255 A1 * | 12/2006 | Xu et al. | 426/589 |
| 2008/0190301 A1 * | 8/2008 | Peng | 99/348 |
| 2008/0198688 A1 * | 8/2008 | Peng | 366/145 |
| 2008/0202349 A1 * | 8/2008 | Peng | 99/329 |
| 2008/0264270 A1 * | 10/2008 | Peng | 99/331 |
| 2008/0264927 A1 * | 10/2008 | Peng | 219/452.11 |
| 2009/0260523 A1 * | 10/2009 | Peng | 99/348 |
| 2009/0260524 A1 * | 10/2009 | Wang et al. | 99/357 |
| 2010/0282095 A1 * | 11/2010 | Highnote | 99/403 |
| 2011/0232506 A1 * | 9/2011 | Cai | 99/484 |
| 2012/0093996 A1 * | 4/2012 | Martin et al. | 366/589 |
| 2012/0189746 A1 * | 7/2012 | DeLong | 426/231 |
| 2012/0205475 A1 * | 8/2012 | Wu | 241/101.3 |
| 2012/0213902 A1 * | 8/2012 | Leung et al. | 426/510 |
| 2013/0074700 A1 * | 3/2013 | Cheung | 99/348 |

* cited by examiner

SOUP MAKER

BACKGROUND OF THE INVENTION

The present invention relates to a soup maker and, more particularly, to a soup maker with accurate temperature detection and enhanced use safety.

Conventional soup makers can mix and heat foods simultaneously to make a hot soup and generally include a container, a base, a heating device, and a blade device. U.S. Pat. No. 7,780,337 discloses a blend soup maker including a jar for receiving food, blade means installed inside the jar, and heating means installed on a bottom of the jar. A motor is installed inside a base support and coupled to the blade means. A thermostat is preloaded with a spring member to contact with a thermo plate for detecting and limiting the temperature of the heating means.

However, such temperature detection is indirect and, thus, has a large error such that the heating means keeps heating while the food in the jar has reached the predetermined temperature. Furthermore, the heat flow below the jar is not blocked in the radial direction while the heating means is heating the jar, such that the low heating efficiency is low and the base support has an excessively high temperature.

BRIEF SUMMARY OF THE INVENTION

An objective of the present invention is to provide a soup maker with accurate temperature detection, enhanced use safety, and enhanced heating efficiency.

A soup maker according to the present invention includes a container including a hollow interior having an opening in an upper end thereof. An upper lid is removably engaged in the opening of the container. A container seat assembly includes an annular seat, a thermally conducting pan, a cutter, a transmission unit, a heating pan, a power supply terminal, and a temperature sensor. The annular seat includes an annular wall defining a space. An inner flange is formed on an inner periphery of the annular wall and divides the space of the annular seat into an upper portion and a lower portion. The container has a lower end fittingly received in the upper portion of the space of the annular seat. A positioning plate is formed on the inner periphery of the annular seat and located below the inner flange. The heat conducting pan is mounted in the annular seat and adapted for receiving food. The thermally conducting pan includes an outer periphery engaged with the inner flange. The thermally conducting pan further includes a through-hole in a central portion thereof. The cutter is mounted above the thermally conducting pan. The transmission unit includes a transmission shaft having a top end extended through the through-hole of the thermally conducting pan and coupled with the cutter. The heating pan is located below the thermally conducting pan and abuts a bottom of the thermally conducting pan. The heating pan is connected to a heating tube that generates heat when supplied with electricity. The heating pan further includes a hole in a central thereof. The transmission unit extends through the hole of the heating pan. The power supply terminal is located below the heating pan and has a top end electrically connected to the heating tube. The temperature sensor is located below the heating pan and includes an end abutting the heating pan to directly detect a temperature of the heating pan. The temperature sensor includes a coupling section.

The soup maker further includes a base unit including a base, a motor, and a control circuit board. The base includes an upper end having a coupling portion coupled with the container seat assembly. The motor and the control circuit board are mounted below the coupling portion. The control circuit board is adapted to connect with an external power source. The control circuit board is operable to adjust temperature detection and to control operation of the motor and the heating tube. The coupling portion includes a mounting face having a central portion. A driving shaft is mounted to the central portion of the mounting face and driven by the motor. The driving shaft is coupled to the transmission shaft of the transmission unit. The mounting face further includes a terminal hole and a sensor hole. A positioning switch is provided on the mounting face and pressable by the positioning plate. The positioning switch is electrically connected to the control circuit board. The control circuit board is operable to control the motor and the heating tube when the positioning switch is pressed. The positioning plate presses against the positioning switch when the annular seat is coupled with the coupling portion of the base, with the power supply terminal extending into the terminal hole, and with the coupling section of the temperature sensor extending into the sensor hole.

Preferably, the thermally conducting pan includes a hollow peg at a central portion thereof. The hollow peg includes the through-hole of the thermally conducting pan. The transmission unit further includes a bearing, a shaft sleeve, a transmission collar, and a conic sealing cap. The bearing is mounted around the transmission shaft. The shaft sleeve is fittingly received in the hollow peg and receives the bearing. The transmission collar is mounted to a lower end of the transmission shaft and is coupled to the driving shaft. The conic sealing cap is mounted between a lower end of the shaft sleeve and the transmission collar.

Preferably, the container seat assembly further includes a thermally insulating cover mounted below the thermally conducting pan and including an annular wall enclosing the heating pan. The thermally insulating cover further includes a through-hole and a through-slot. The transmission unit extends through the through-hole of the thermally insulating cover. The power supply terminal and the coupling section of the temperature sensor extend through the through-slot of the thermally insulating cover.

Preferably, the base includes an inner wall protruding from the mounting face. A lower end of the annular wall of the annular seat engages with the inner wall of the base. The base further includes an outer wall protruding from the mounting face and surrounding the inner wall. A compartment is defined between the inner and outer walls. The outer wall of the base includes a notch.

Preferably, the upper lid includes a through-hole in a central portion thereof, and a small lid is removably mounted in the through-hole of the upper lid.

The present invention will become clearer in light of the following detailed description of illustrative embodiments of this invention described in connection with the drawings.

DETAILED DESCRIPTION OF THE INVENTION

With reference to FIGS. 1-6, a soup maker according to the present invention includes a container 1, an upper lid 2, a container seat assembly 3, and a base unit 4. The container 1 includes a hollow interior 11 having an opening 12 in an upper end thereof. The upper lid 2 is removably engaged in the opening 12 of the container 1. The upper lid 2 includes a through-hole 21 in a central portion thereof. A small lid 22 is mounted in the through-hole 21 of the upper lid 2.

Figure 1:
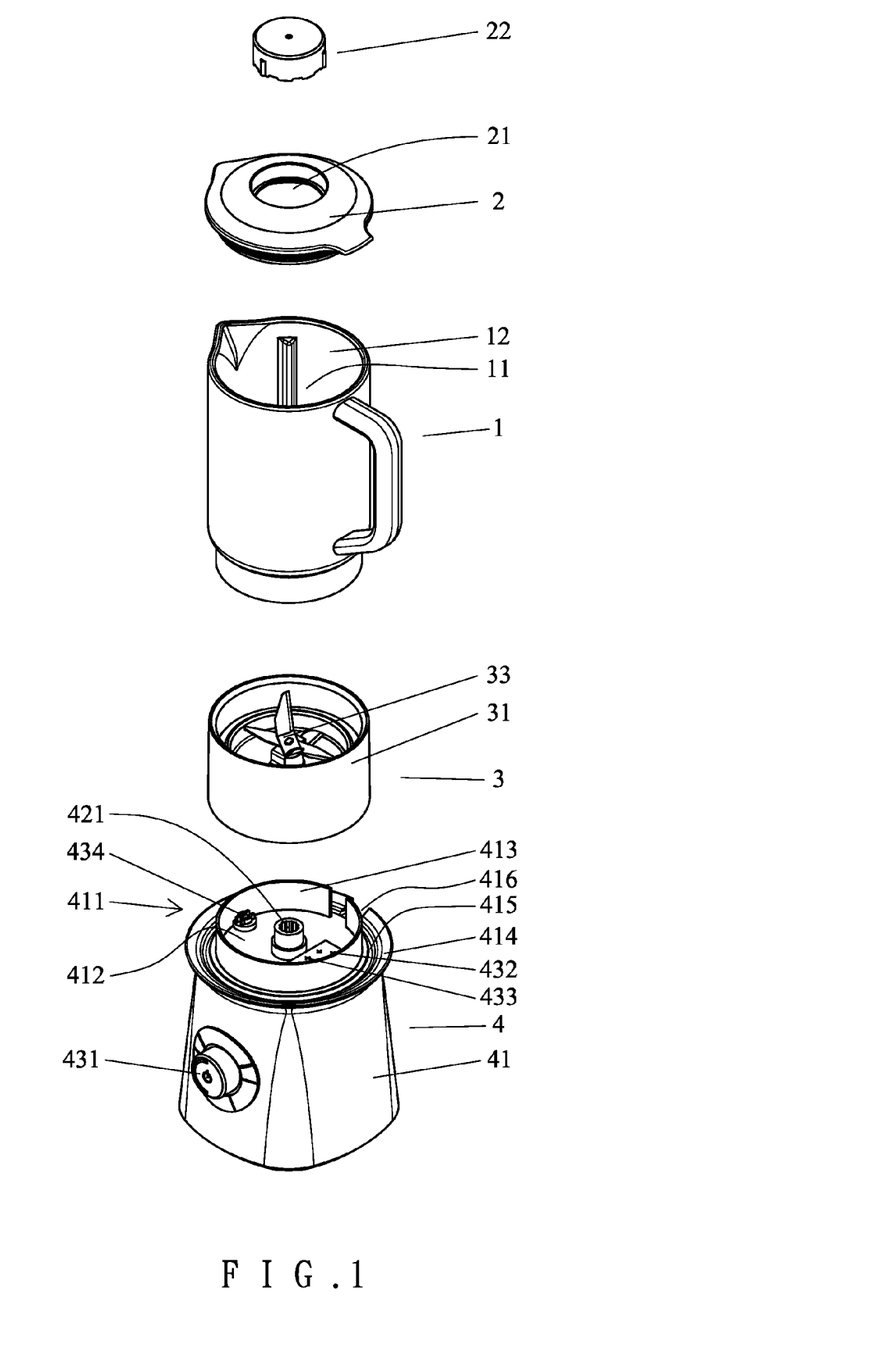
FIG. 1 is an exploded, perspective view of a soup maker according to the present invention.
Figure 2:
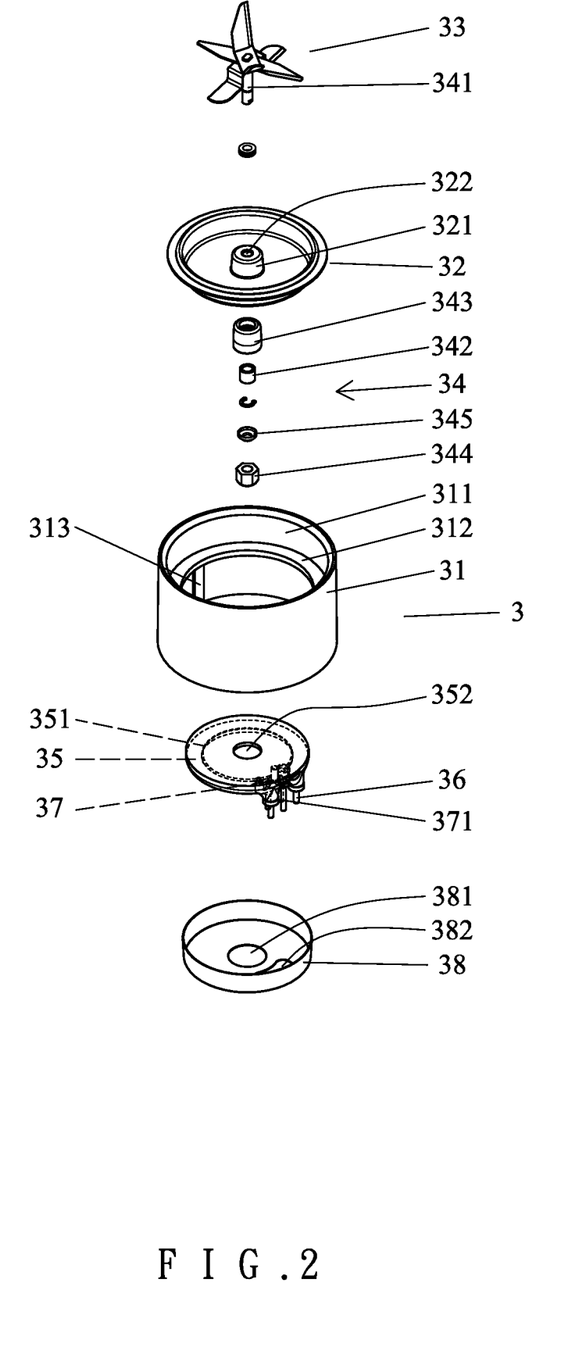
FIG. 2 is an exploded, perspective view of a container seat assembly of the soup maker of FIG. 1.
Figure 3:
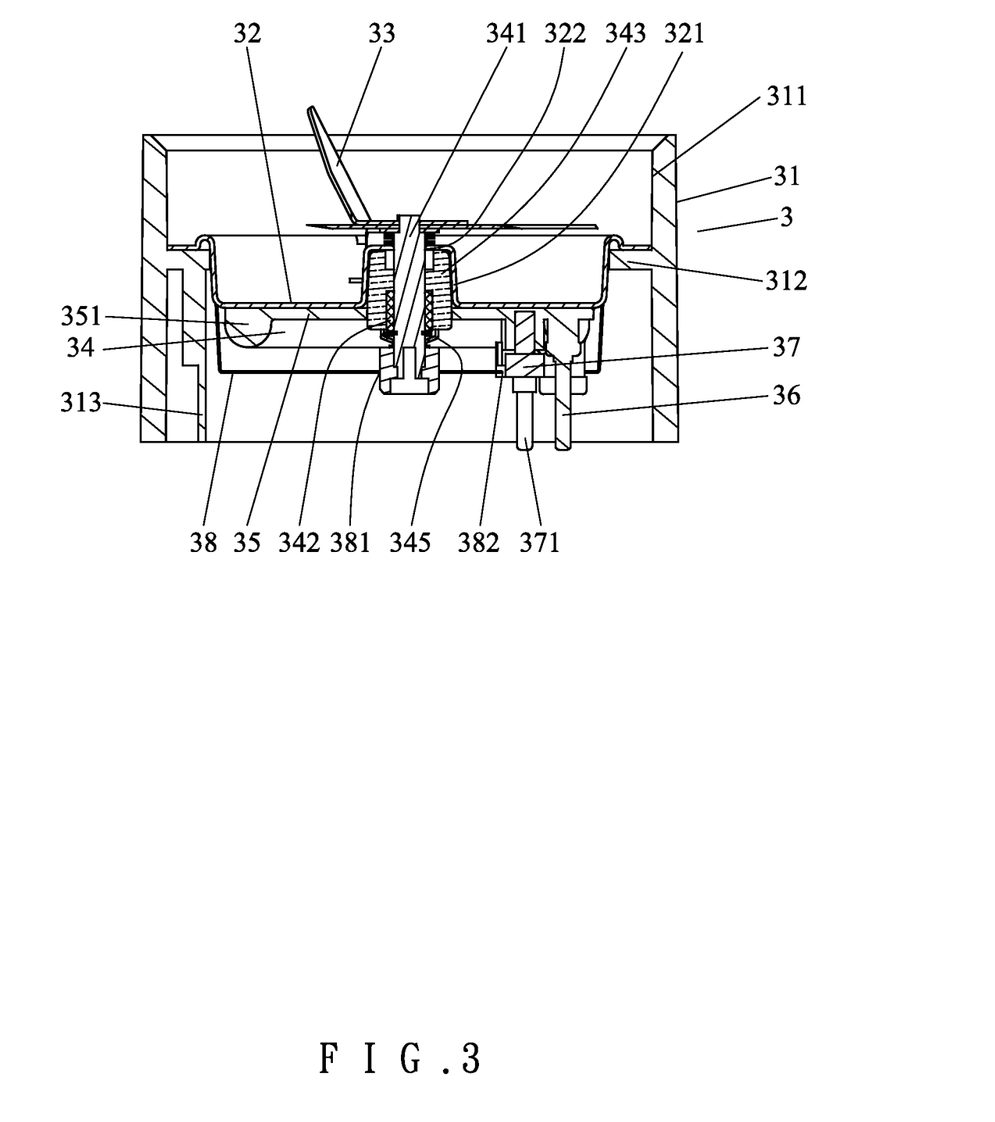
FIG. 3 is a cross sectional view of the container seat assembly of FIG. 2.

In the form shown, the container seat assembly 3 includes an annular seat 31, a thermally conducting pan 32, a cutter 33, a transmission unit 34, a heating pan 35, a power supply terminal 36, a temperature sensor 37, and a thermally insulating cover 38. The annular seat 31 includes an annular wall 311 defining a space. An inner flange 312 is formed on an inner periphery of the annular wall 311 and dividing the space of the annular seat 31 into an upper portion and a lower portion. The container 1 has a lower end fittingly received in the upper portion of the space of the annular seat 31. A positioning plate 313 is formed on the inner periphery of the annular seat 311 and located below the inner flange 312. The heat conducting pan 32 is mounted in the annular seat 31 and adapted for receiving food. The thermally conducting pan 32 includes an outer periphery engaged with the inner flange 312. The thermally conducting pan 32 includes a hollow peg 321 at a central portion thereof. The hollow peg 321 includes a through-hole 322. The cutter 33 is mounted above the thermally conducting pan 32.

In the form shown, the transmission unit 34 includes a transmission shaft 341, a bearing 342, a shaft sleeve 343, a transmission collar 344, and a conic sealing cap 345. The transmission shaft 341 has a top end extending through the through-hole 322 of the thermally conducting pan 32 and coupled with the cutter 33. The bearing 342 is mounted around the transmission shaft 341. The shaft sleeve 343 is fittingly received in the hollow peg 321 and receives the bearing 342 to provide a waterproof function and a shock absorbing function. The transmission collar 344 is mounted to a lower end of the transmission shaft 341. The conic sealing cap 345 is mounted between a lower end of the shaft sleeve 343 and the transmission collar 344.

In the form shown, the heating pan 35 is located below the thermally conducting pan 32 and abuts a bottom of the thermally conducting pan 32. The heating pan 35 is connected to a heating tube 351 that generates heat when supplied with electricity. The heating pan 35 further includes a hole 352 in a central thereof. The transmission unit 34 extends through the hole 352 of the heating pan 35. The power supply terminal 36 is located below the heating pan 35 and has a top end electrically connected to the heating tube 351. The temperature sensor 37 is located below the heating pan 35 and includes an end abutting the heating pan 35 to directly detect a temperature of the heating pan 35. The temperature sensor 37 includes a coupling section 371 at a lower end thereof. The thermally insulating cover 38 is mounted below the heating pan 35 and includes an annular wall enclosing the thermally conducting pan 32. The thermally insulating cover 38 further includes a through-hole 381 and a through-slot 382. The transmission unit 34 extends through the through-hole 382 of the thermally insulating cover 38. The power supply terminal 36 and the coupling section 371 of the temperature sensor 37 extend through the through-slot 382 of the thermally insulating cover 38.

Figure 4:
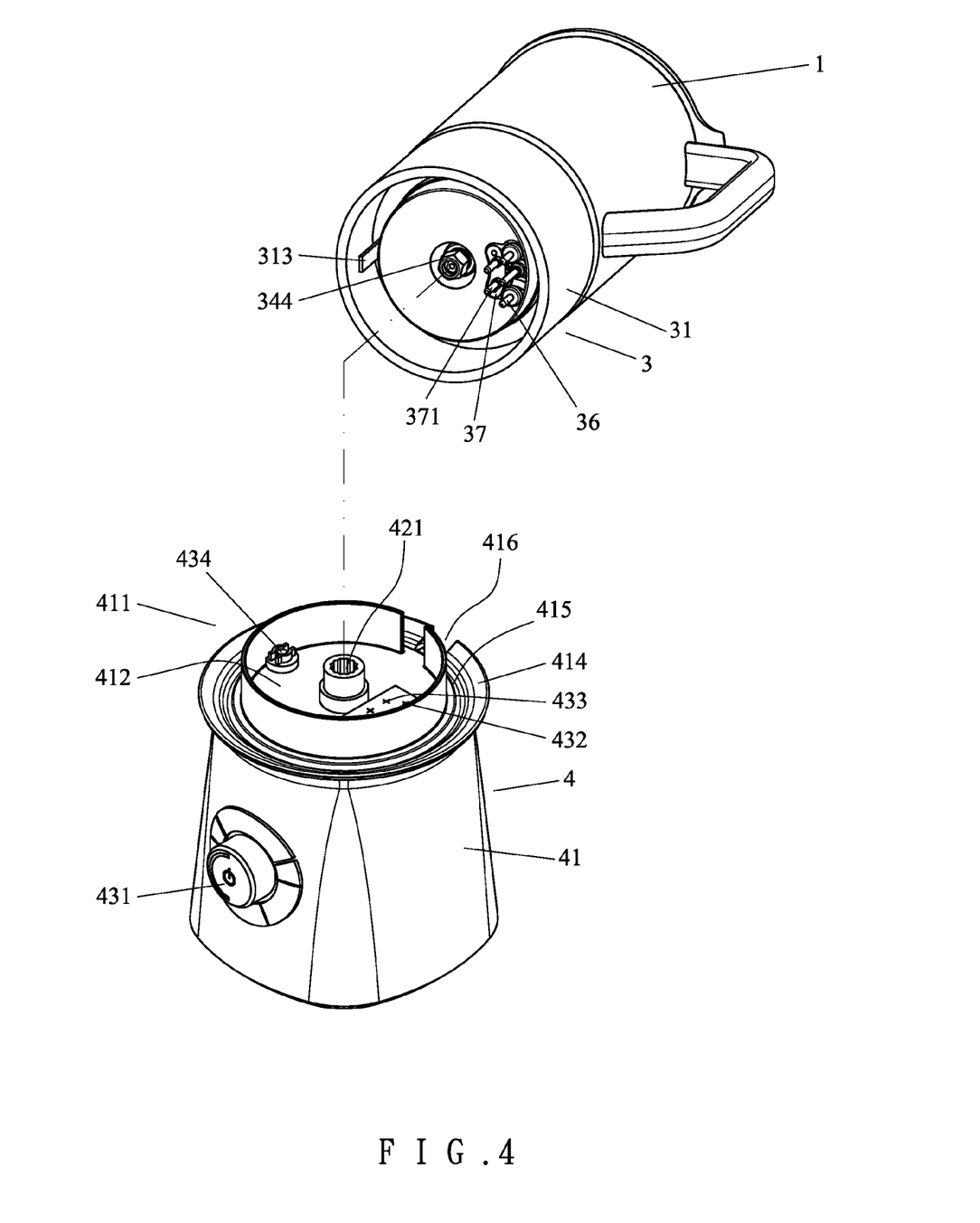
FIG. 4 is another exploded, perspective view of the soup maker of FIG. 1.

In the form shown, the base unit 4 includes a base 41, a motor 42, and a control circuit board 43. The base 41 includes an upper end having a coupling portion 411 coupled with the container seat assembly 3. The motor 42 and the control circuit board 43 are mounted below the coupling portion 411. The control circuit board 43 is adapted to connect with an external power source. The control circuit board 43 is connected to a control button 431 on the base 41 and operable to adjust temperature detection and to control operation of the motor 42 and the heating tube 351.

In the form shown, the coupling portion 411 includes a mounting face 412 for coupling with the annular seat 31. A driving shaft 421 is mounted to a central portion of the mounting face 412 and driven by the motor 42. The driving shaft 421 is coupled to the transmission collar 344 of the transmission unit 34. The mounting face 412 further includes a terminal hole 432 and a sensor hole 433. When the power supply terminal 36 is inserted into the terminal hole 432 and the coupling section 371 of the temperature sensor 37 is inserted into the sensor hole 433, the power supply terminal 36 and the temperature sensor 37 are electrically connected to the control circuit board 43. A positioning switch 434 is provided on the mounting face 412 and pressable by the positioning plate 313. The positioning switch 434 is electrically connected to the control circuit board 434. The control circuit board 43 is operable to control the motor 42 and the heating tube 351 when the positioning switch 434 is pressed. The positioning plate 313 presses against the positioning switch 434 when the annular seat 31 is coupled with the coupling portion 411 of the base 41, with the power supply terminal 36 extending into the terminal hole 432, and with the coupling section 371 of the temperature sensor 37 extending into the sensor hole 433.

In the form shown, the base 41 further includes an inner wall 413 protruding from the mounting face 412. A lower end of the annular wall 311 of the annular seat 31 engages with the inner wall 413 of the base 41. An outer wall 414 protrudes from the mounting face 412 and surrounds the inner wall 413, with a compartment 415 defined between the inner and outer walls 413 and 414. The outer wall 414 of the base 41 includes a notch 416 for guiding soup.

Figure 5:
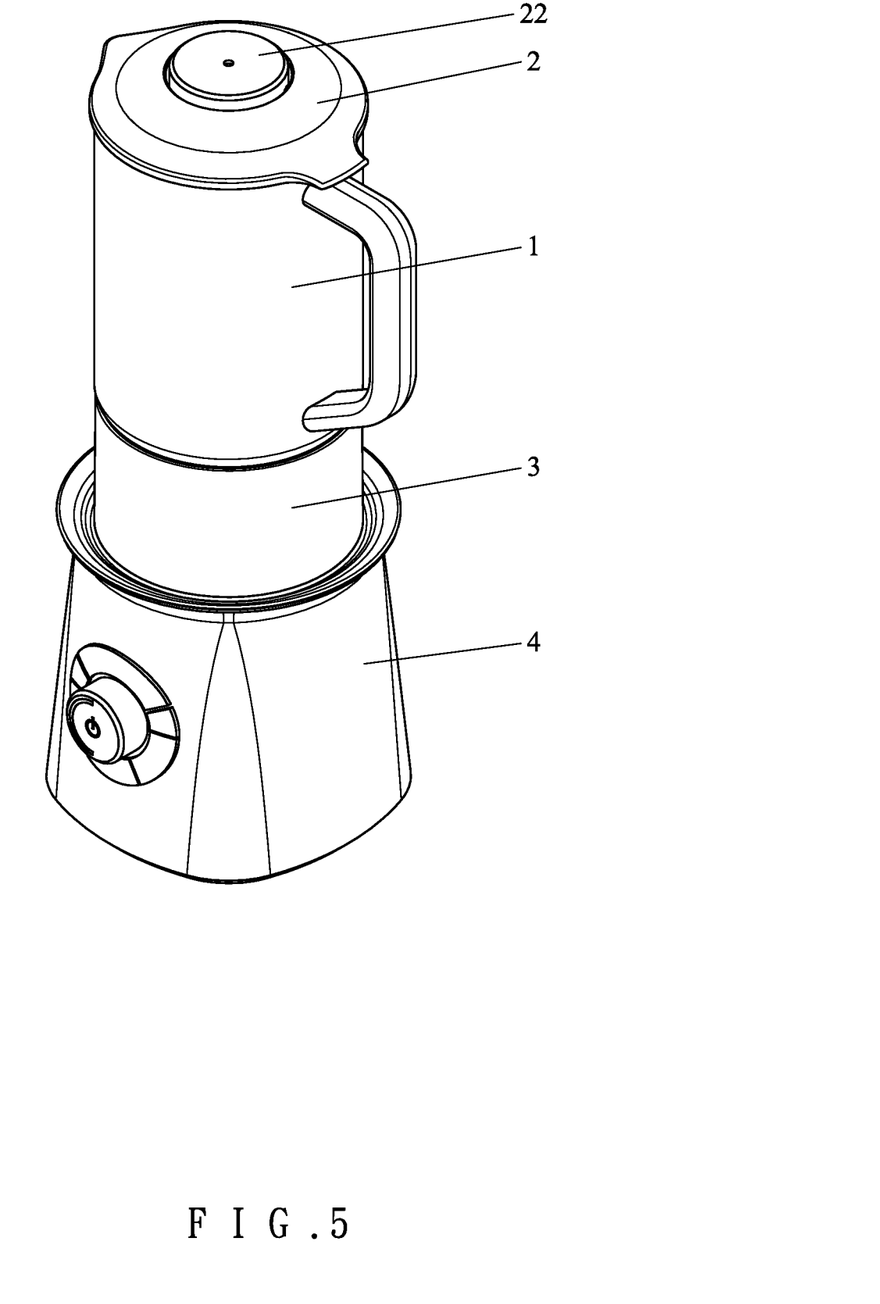
FIG. 5 is a perspective view of the soup maker of FIG. 4 after assembly.
Figure 6:
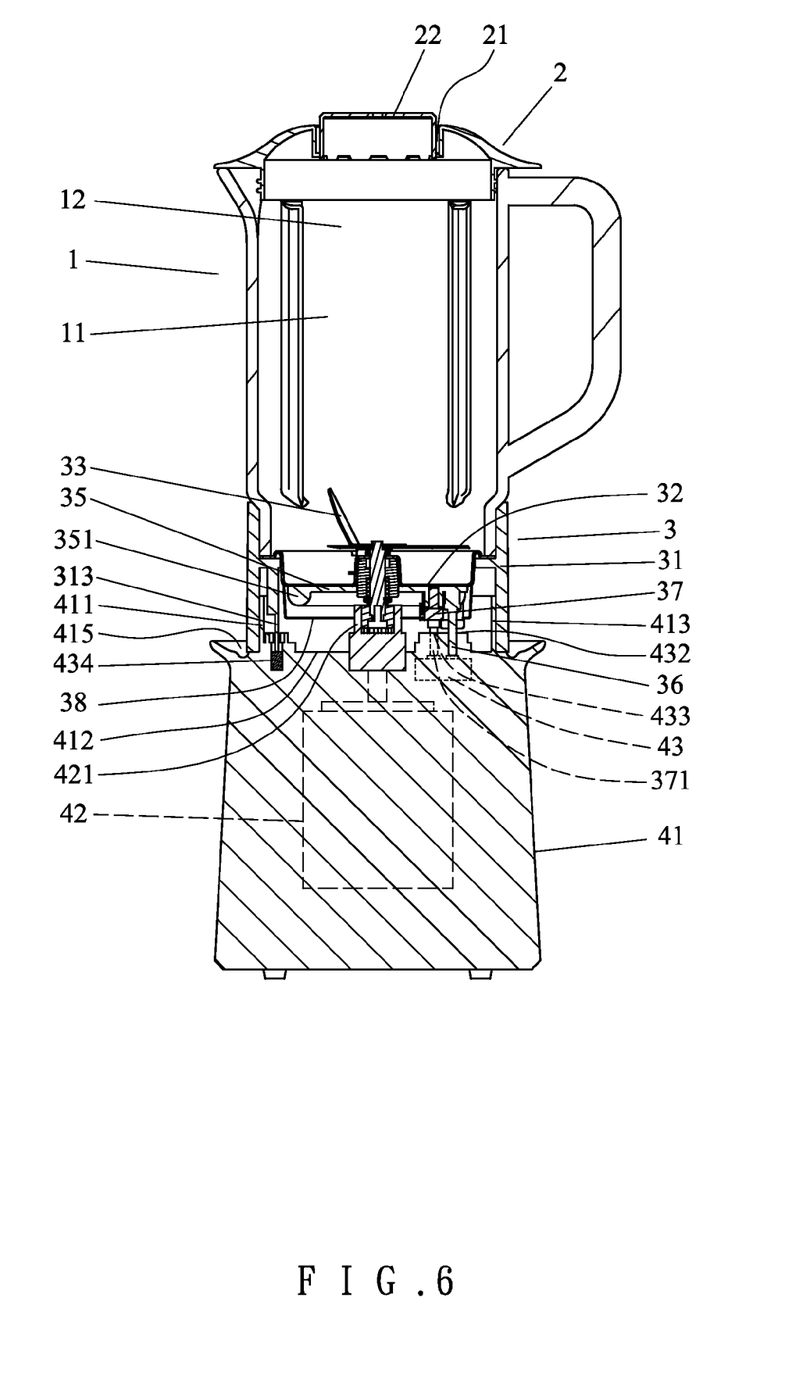
FIG. 6 is a cross sectional view of the soup maker of FIG. 5.

With reference to FIGS. 5 and 6, when the positioning plate 313 of the annular seat 31 of the container seat assembly 3 engages with and presses against the positioning switch 434, the power supply terminal 36 extends into the terminal hole 432, and the coupling section 371 of the temperature sensor 37 extends into the sensor hole 433. Furthermore, the driving shaft 421 is coupled to the transmission collar 344. The annular wall 311 of the annular seat 31 engages with the inner wall 413 of the base 41 to provide enhanced assembling stability. The positioning switch 434 engages with the positioning plate 313 to assure the annular seat 31 is mounted in the correct position on the base 41.

In use, food is placed into the container 1 and covered by the upper lid 2. The control button 431 can be used to control operation of the motor 42 to drive the cutter 33 to rotate, cutting and mixing the food. The heating tube 351 can be controlled to heat the heating pan 35, the thermally conductive pan 32, and the food. The small lid 22 can be removed to add small food ingredients and seasonings into the container 1 without opening the upper lid 2, providing use convenience. In a case that the soup in the container 1 overflows into the compartment 415 of the base 41, the soup in the compartment 415 can be discharged via the notch 416, providing use safety.

Since the temperature sensor 37 directly detects the temperature of the heating pan 35 directly abutting the thermally conducting pan 32, the control circuit board 43 can accurately detect the temperature of the thermally conducting pan 32 to control heating of the heating tube 351, providing enhanced use safety. Furthermore, the thermally insulting cover 38 reduces undesired outflow of the heat energy, increasing the heating efficiency. Further, the thermally insulting cover 38 prevents the heat from flowing to the base 4, avoiding damage to the motor 42 and the control circuit board 43 resulting from overheating. Enhanced use safety is, thus, provided.

When not in use, the container 1 can be removed, and the annular seat 31 can be detached from the base 41, assuring that the power supply terminal 36 and the temperature sensor 37 are disconnected from the control circuit board 43, providing enhanced use safety. Furthermore, when cleaning the container 1 and the annular seat 31 with a detergent, the conic sealing cap 345 avoids wetting of the transmission shaft 341 by the detergent.

Although specific embodiments have been illustrated and described, numerous modifications and variations are still possible without departing from the scope of the invention. The scope of the invention is limited by the accompanying claims.

The invention claimed is:

1. A soup maker comprising: a container including a hollow interior having an opening in an upper end thereof; an upper lid removably engaged in the opening of the container; a container seat assembly including an annular seat, a thermally conducting pan, a cutter, a transmission unit, a heating pan, a power supply terminal, and a temperature sensor, with the annular seat including an annular wall defining a space, with an inner flange formed on an inner periphery of the annular wall and dividing the space of the annular seat into an upper portion and a lower portion, with the container having a lower end fittingly received in the upper portion of the space of the annular seat, with a positioning plate formed on the inner periphery of the annular seat and located below the inner flange, with the thermally conducting pan mounted in the annular seat and adapted for receiving food, with the thermally conducting pan including an outer periphery engaged with the inner flange, with the thermally conducting pan further including a through-hole in a central portion thereof, with the cutter mounted above the thermally conducting pan, with the transmission unit including a transmission shaft, with the transmission shaft having a top end extended through the through-hole of the thermally conducting pan and coupled with the cutter, with the heating pan located below the thermally conducting pan and abutting a bottom of the thermally conducting pan, with the heating pan connected to a heating tube, with the heating tube generating heat when supplied with electricity, with the heating pan further including a hole in a central part thereof, with the transmission unit extending through the hole of the heating pan, with the power supply terminal located below the heating pan and having a top end electrically connected to the heating tube, with the temperature sensor located below the heating pan and including an end abutting the heating pan to directly detect a temperature of the heating pan, with the temperature sensor including a coupling section; and a base unit including a base, a motor, and a control circuit board, with the base including an upper end having a coupling portion, with the coupling portion coupled with the container seat assembly, with the motor and the control circuit board mounted below the coupling portion, with the control circuit board adapted to connect with an external power source, with the control circuit board operable to adjust temperature detection and to control operation of the motor and the heating tube, with the coupling portion including a mounting face having a central portion, with a driving shaft mounted to the central portion of the mounting face and driven by the motor, with the driving shaft coupled to the transmission shaft of the transmission unit, with the mounting face further including a terminal hole and a sensor hole, with a positioning switch provided on the mounting face and pressable by the positioning plate, with the positioning switch electrically connected to the control circuit board, with the control circuit board operable to control the motor and the heating tube when the positioning switch is pressed, with the positioning plate pressing against the positioning switch when the annular seat is coupled with the coupling portion of the base, with the power supply terminal extending into the terminal hole, and with the coupling section of the temperature sensor extending into the sensor hole, with the thermally conducting pan including a hollow peg at the central portion thereof, with the hollow peg including the through-hole of the thermally conducting pan, with the transmission unit further including a bearing, a shaft sleeve, a transmission collar, and a conic sealing cap, with the bearing mounted around the transmission shaft, with the shaft sleeve fittingly received in the hollow peg and receiving the bearing, with the transmission collar mounted to a lower end of the transmission shaft and coupled to the driving shaft, with the conic sealing cap mounted between a lower end of the shaft sleeve and the transmission collar, and with the base including an inner wall protruding from the mounting face, with a lower end of the annular wall of the annular seat engaged with the inner wall of the base, with the base further including an outer wall protruding from the mounting face and surrounding the inner wall, with a compartment defined between the inner and outer walls, with the outer wall of the base including a notch.

2. The soup maker as claimed in claim 1, with the container seat assembly further including a thermally insulating cover mounted below the thermally conducting pan and including an annular wall enclosing the heating pan, with the thermally insulating cover further including a through-hole and a through-slot, with the transmission unit extending through the through-hole of the thermally insulating cover, with the power supply terminal and the coupling section of the temperature sensor extending through the through-slot of the thermally insulating cover.

3. The soup maker as claimed in claim 1, with the upper lid including a through-hole in a central portion thereof, with a small lid removably mounted in the through-hole of the upper lid.

* * * * *